United States Patent [19]

Rao et al.

[11] 4,216,192

[45] Aug. 5, 1980

[54] METHOD OF MAKING ANHYDROUS LITHIUM THIOCYANATE

[75] Inventors: Bhaskara M. L. Rao, Fanwood; Lawrence P. Klemann, Somerville, both of N.J.

[73] Assignee: Exxon Research & Engineering Co., Florham Park, N.J.

[21] Appl. No.: 34,579

[22] Filed: Apr. 30, 1979

[51] Int. Cl.$^2$ .............................................. C01C 3/20
[52] U.S. Cl. .................................................. 423/366
[58] Field of Search ........................................ 423/366

[56] References Cited

U.S. PATENT DOCUMENTS

| | | | |
|---|---|---|---|
| 3,047,363 | 7/1962 | Field et al. | 423/366 |
| 3,049,406 | 8/1962 | Grant et al. | 423/499 |

FOREIGN PATENT DOCUMENTS 243727  3/1963  Australia .................................. 423/366

*Primary Examiner*—Wayne A. Langel
*Attorney, Agent, or Firm*—Kenneth P. Glynn

[57] ABSTRACT

The present invention is directed to a method of making anhydrous lithium thiocyanate and solutions containing anhydrous lithium thiocyanate by reacting a thiocyanate reactant selected from the group consisting of inorganic ammonium thiocyanate, quaternary alkyl ammonium thiocyanates, trialkyl ammonium thiocyanates, non-lithium alkali metal thiocyanates and alkaline earth metal thiocyanates, with a lithium salt selected from the group consisting of $LiClO_4$; $LiAsF_6$; $LiBF_4$; $LiPF_6$; $LiO_3SCF_3$; $LiNO_2$; $LiNO_3$; $LiCl$; $LiBr$; $LiI$; $LiO_2CCF_3$; $LiOC_6H_5$; $LiB(C_6H_5)_4$ and $LiBR_4$ wherein R is methyl, ethyl, butyl or mixtures thereof, in an organic solvent in which the reactants are soluble.

15 Claims, No Drawings

METHOD OF MAKING ANHYDROUS LITHIUM THIOCYANATE

BACKGROUND OF THE INVENTION

1. Field of the Invention

The present invention relates to a method of making anhydrous lithium thiocyanate and solutions containing anhydrous lithium thiocyanate. More particularly, the present invention is directed to the method of making the anhydrous lithium thiocyanate and the solutions containing that material by metathetical reaction techniques, as more fully developed below.

2. Description of the Prior Art

There have been many techniques developed over the past few years for the synthesis of inorganic-alkali metal and organic-alkali metal salts. For example, Kunze et al, J. Phys. Chem. 67, 385 (1963) describe the preparation of lithium tetraphenyl boride by the reaction of sodium tetraphenyl boride with lithium chloride in ethanol, and Bhattacharyya et al, J. Phys, Chem. 69, 608 (1965) describe the preparation of alkali metal tetraphenyl boride salts by the reaction of sodium tetraphenyl boride with lithium chloride in THF solvent. Revzin et al, Chemical Abstracts 70, 28974 q (1969) and Chemical Abstracts 71, 3416 s (1969) describe the preparation of lithium tetraphenyl boride from various salts, including ammonium tetraphenyl boride with lithium-containing ion exchange resins in acetone. Likewise, Kirgintsev et al, Chemical Abstracts 72, 139078 m (1970) describe the formation of lithium tetraphenyl borate and sodium tetraphenyl borate using potassium tetraphenyl borate with an ion exchange resin of the lithium form and using acetone solvent. Kozitskii, Chemical Abstracts 79, 83825 c (1973) describe the preparation of lithium tetraphenyl borate and the like by reaction of the potassium analogue with a lithium-containing ion exchange resin in the presence of acetone and water. (It should be noted that various prior art references refer to the same compounds as tetraphenyl borate or as tetraphenyl borides.) Kohl'kin et al, Chemical Abstracts 85, 86471 u (1976) describe the preparation of lithium tetraphenyl boride from sodium tetraphenyl boride but do not describe the source of lithium except to point out that it is an exchange synthesis, i.e. exchange extraction synthesis. Wittig et al, Ann. 563, 110 (1949) and Chemical Abstracts 46, 6607 d (1952) respectively teach the preparation of lithium tetraphenyl boride and the like from triphenyl boron and trifluoro boron sources reacted with lithium phenyl salt in ether solvents. Grassberger et al, Angew. Chem. Int. Ed. Engl. 8, 275 (1969) describe the preparation of various alkali metal tetraorganyl borates by reaction of, for example, triphenyl boron with lithium tetraethyl boride without solvent.

Lee, Oakridge National Laboratory contribution to the Journal of Inorganic Chemistry, Volume 3, No. 2, Feb. 1964, pp. 289–90 describes the synthesis of lithium thiocyanate from hydrated lithium hydroxide and ammonium thiocyanate. U.S. Pat. No. 3,049,406 describes the preparation of anhydrous lithium salts, including lithium halides, lithium pseudohalides, such as lithium cyanide and lithium thiocyanate, by the reaction of lithium hydride with halogens, cyanogen or thiocyanogen in an ether solution. The dehydration of hydrated thiocyanate salts to form anhydrous thiocyanates is also described by S. Petrucci (J. Phys. Chem. 82, pp. 545–552, 1978).

Notwithstanding all of the aforementioned prior art directed to various methods of preparing alkali metal salts, to date no reference has been published which teaches or renders obvious the methods of preparation described herein.

BRIEF DESCRIPTION OF THE INVENTION

The present invention is directed to a method of making anhydrous lithium thiocyanate and solutions containing anhydrous lithium thiocyanate by reacting a thiocyanate reactant selected from the group consisting of inorganic ammonium thiocyanate, quaternary alkyl ammonium thiocyanates, trialkyl ammonium thiocyanates, non-lithium alkali metal thiocyanates and alkaline earth metal thiocyanates, with a lithium salt selected from the group consisting of $LiClO_4$; $LiAsF_6$; $LiBF_4$; $LiPF_6$; $LiO_3SCF_3$; $LiNO_2$; $LiNO_3$; $LiCl$; $LiBr$; $LiI$; $LiO_2CCF_3$; $LiOC_6H_5$; $LiBR_4$ wherein R is methyl, ethyl, butyl or mixtures thereof, in an organic solvent in which the reactants are soluble.

DETAILED DESCRIPTION OF THE INVENTION

The present invention is directed to a method of making anhydrous lithium thiocyanate and solutions containing anhydrous lithium thiocyanate by reacting a thiocyanate reactant selected from the group consisting of inorganic ammonium thiocyanate, quaternary alkyl ammonium thiocyanates, trialkyl ammonium thiocyanates, non-lithium alkali metal thiocyanates and alkaline earth metal thiocyanates, with a lithium salt selected from the group consisting of $LiClO_4$; $LiAsF_6$; $LiBF_4$; $LiPF_6$; $LiO_3SCF_3$; $LiNO_2$; $LiNO_3$; $LiCl$; $LiBr$; $LiI$; $LiO_2CCF_3$; $LiOC_6H_5$; $LiBR_4$ wherein R is methyl, ethyl, butyl or mixtures thereof, in an organic solvent in which the reactants are soluble.

The thiocyanate reactant is, as mentioned, selected from the group consisting of inorganic ammonium thiocyanate, quaternary alkyl ammonium thiocyanates, trialkyl ammonium thiocyanates, non-lithium alkali metal thiocyanates, and alkaline earth metal thiocyanates. The quaternary alkyl ammonium thiocyanates which may be employed include those of the formula $NR_4'$ wherein the R's may be the same or different and are selected from the group consisting of methyl, ethyl, propyl, butyl, pentyl and hexyl. Of the quaternary alkyl ammonium thiocyanates which may be used, $N(butyl)_4$, $N(pentyl)_4$ and $N(hexyl)_4$ are preferred. Among the trialkyl ammonium thiocyanates which may be used are trimethyl ammonium thiocyanate, dimethyl ethyl ammonium thiocyanate, methyl diethyl ammonium thiocyanate, triethyl ammonium thiocyanate, and the higher alkyl homologues of these compounds. Among the non-lithium alkakli metal thiocyanates and the alkaline earth metal thiocyanates which may be employed in the method of the present invention are sodium thiocyanate, potassium thiocyanate, magnesium thiocyanate, calcium thiocyanate and the like. Of these, sodium thiocyanate and potassium thiocyanate are preferred.

In practicing the meethod of the present invention in some instances, the anhydrous lithium thiocyanate obtained by the foregoing methods may settle out of the reaction solution with or without coordinating solvent molecules. Thus, in this process the anhydrous lithium thiocyanate may be separated by known techniques, e.g., filtration. In other instances, the anhydrous lithium thiocyanate may remain in solution and an in situ formation of the anhydrous lithium thiocyanate is achieved so as to directly yield an anhydrous lithium thiocyanate solution. Whether the anhydrous lithium thiocyanate formed by the above-mentioned reaction is predominantly settled out or is predominantly dissolved or is a combination of the two depends upon the particular starting reactants, the stoichiometry, the concentration of reactants in the solvent, and the choice of solvent.

For example, it has been recognized that, in general, when an organic ammonium thiocyanate reactant, i.e. quaternary alkyl ammonium thiocyanate or trialkyl ammonium thiocyanate, is reacted in a solvent in which lithium thiocyanate is only slightly or sparingly soluble, with a lithium salt selected from the group consisting of $LiClO_4$; $LiAsF_6$; $LiOOCCF_3$; $LiBF_4$; $LiPF_6$; $LiI$ and $LiBR_4$ wherein R is methyl, ethyl, butyl or mixtures thereof, a settled out anhydrous lithium thiocyanate product will be obtained. Of these lithium salts, preferred for obtaining solid product are LiI and $LiBR_4$, with the $LiBR_4$ salts being most preferred. As mentioned, the ammonium thiocyanate is reacted with one of the above-mentioned lithium salts in an organic solvent in which the reactants are soluble and in which lithium thiocyanate is sparingly soluble. Among the solvents which may be employed for this particular result to be achieved are benzene, toluene and xylene.

The second step when the preparation of the solid anhydrous lithium thiocyanate is desired involves the removal of the salt from the reaction solution, as mentioned, by known separation techniques. Although simple filtration will work, other techniques such as centrifugation or sedimentation may be employed.

Additionally, it has been recognized that in the method of the present invention wherein the preparation of solutions containing anhydrous thiocyanate is desired, a thiocyanate compound selected from the group consisting of inorganic ammonium thiocyanate, non-lithium alkali metal thiocyanates, alkaline earth metal thiocyanates, is reacted with a lithium salt selected from the group consisting of LiCl; LiBr; LiI; $LiOOCCH_3$; $LiO_2CCF_3$; $LiNO_3$; $LiNO_2$; $LiOC_6H_5$; $LiB(C_6H_5)_4$; $LiO_3SCF_3$; $LiClO_4$; $LiAsF_6$; $LiPF_6$; and $LiBF_4$. The thiocyanate compound reactant is preferably a non-lithium alkali metal thiocyanate and is most preferably sodium or potassium thiocyanate. The lithium salt described above is preferably LiCl; LiBr; $LiOOCCH_3$ and $LiB(C_6H_5)_4$, and is most preferably LiCl or LiBr.

In this embodiment, the metal thiocyanate reactant and the lithium salt reactant are reacted in an organic aprotic solvent in which lithium thiocyanate is soluble. Thus, when the reactants do react, the reaction product of anhydrous lithium thiocyanate is soluble in the solvent and as such is separated from the relatively insoluble byproduct salts. In general, the organic aprotic solvent may be any solvent in which the reactants are soluble and in which lithium thiocyanate is soluble. Among the solvents which may be used are the ethers, including cyclic ethers, cyclic esters, lactones, amides, nitriles, amines, dialkylsulfoxide, dialkylsulfite and mixtures thereof. Among the specific solvents which may be used are diethyl ether, tetrahydrofuran, 2-methyltetrahydrofuran, dioxolane, 2-methyldioxolane, dimethoxyethane, diglyme, propylene carbonate, ethylene carbonate, butyrolactone, valerolactone, dimethylacetamide, dimethylformamide, acetonitrile, triethylamine, pyridine, dimethylsulfoxide, dimethylcarbonate and dimethylsulfite.

The reaction in this embodiment involves in situ formation of the anhydrous lithium thiocyanate and therefore resident reaction time need not be defined. Otherwise, however, all of the comments made below concerning the conditions for producing solutions containing the anhydrous lithium thiocyanate, (i.e. temperature, pressure, amounts of reactants and solvents, etc.) are applicable here.

An additional advantage of the foregoing embodiment of this invention is the flexibility to select reactants and reactant stoichiometries so as to produce, in situ, a desired solution. At the one extreme, if reactant stoichiometries very close to 1.0 are selected, the final solution will be essentially pure LiSCN and solvent. At the other extreme, reactant stoichiometries can be chosen to produce, in situ, a mixture of salts in the selected solvent. This mixture may contain LiSCN as the major salt component or even as the minor salt component if this condition is desired. Elaborating specifically on the latter condition, one could produce solutions of salts wherein, in addition to $Li^+$ and $SCN^-$ species, other cation or anion species may be present in varying amounts and may, in fact, even comprise the dominant solution species present. In any event, the flexibility of being able to produce solid anhydrous lithium thiocyanate, solutions containing anhydrous lithium thiocyanate, and solutions containing anhydrous lithium thiocyanate with other salts dissolved therein, as well as combinations of these, is all within the contemplation of the scope of the present invention.

Further, although solvents described above have been cited in the context of preferred combinations to achieve either in situ solution formation or solid formation of anhydrous lithium thiocyanate, it should be noted that the present invention includes utilization of any of the above-cited solvents with any of the mentioned reactants, provided that such reactants are soluble therein. Further, regardless of the particular reactants which are employed, they are reacted in one or more of the above-mentioned solvents for a time sufficient for the reaction to occur. In general, a reaction time of about one to 300 hours with stirring or agitation is useful to obtain a significant amount of lithium thiocyanate product. Although it is not essential, it is particularly beneficial to predry the reactant salts and solvents to reduce the water content of the final product and to assure that a substantially anhydrous lithium thiocyanate salt is obtained. In any event, once the reaction has occurred and the lithium thiocyanate is formed, either solid anhydrous lithium thiocyanate begins to settle out of the reaction solution and may be removed by known separation techniques, or anhydrous lithium thiocyanate dissolves into the solvent system as it is formed, or both.

In performing the method of the present invention, any amounts of reactants may be used relative to one another, and any amounts desired may be used with respect to the solvent up to total saturation of the solvent with the reactants. Although it is not essential to the process, it is particularly advantageous to react the two reactants so as to have a stoichiometric excess of the lithium compound. Concerning the solvents, it should be apparent that an adequate amount of solvent be used so as to dissolve the reactant materials which are desired to be reacted. Thus, in general, about 100 to about 20,000 milliliters of solvent per one mole of total reactants is useful. Preferably at least about 300 to about 2500 milliliters of solvent per mole of total reactants may be used. Nonetheless, as mentioned, any amount of reactants relative to the solvent may be employed. In certain cases, particularly where the reactant salts dissolve incompletely in the chosen amount of solvent, vigorous stirring or other form of agitation, will be useful in facilitating the desired reaction.

The reaction involved may be carried out at any operable pressure and temperature, and room temperature and pressure conditions will allow the reaction to readily occur in most instances. However, in some instances, it is preferable to employ elevated temperatures so as to hasten the completion of the metathetical reaction.

By the method of the present invention involving the preparation of anhydrous lithium thiocyanate and solutions containing anhydrous lithium thiocyanate, simple procedures are used which are believed to be more expedient and economical over those heretofore taught. The resulting lithium thiocyanate has many uses as are stated in the published literature, including the synthesis of other useful chemicals, electrochemical reactions, and especially as electrolyte salts for various lithium and other alkali metal-containing anode cells.

The present invention is illustrated in detail by the following examples. However, these examples are presented for illustrative purposes only and the invention should not be construed to be limited thereto.

EXAMPLE 1

Preparation of a Solution Containing Lithium Thiocyanate

About 1.5 moles of potassium thiocyanate were suspended in 500 milliliters of dioxolane solvent. To this suspension, about 1.5 moles of lithium chloride were added and the mixture was stirred for 24 hours. The stirred mixture was allowed to settle and was then filtered to recover a 3 molar lithium thiocyanate-dioxolane solution. Although the filtration was not necessary, it was performed so as to obtain a relatively pure particulate free solution for electrical measurements for possible electrochemical application. The anhydrous lithium thiocyanate-containing solution was measured for specific conductivity and was found to have a conductivity of 0.004 (ohm cm)-1 at room temperature. Further, it was determined that the lithium thiocyanate obtained was essentially anhydrous by Karl Fischer titration.

EXAMPLE 2

Metathesis Reaction Between $LiB(C_2H_5)_3CH_3$ and $(C_6H_{13})_4N$ SCN in Toluene A solution containing about 28 mmole of tetra-n-hexylammonium thiocyanate in 30 g of toluene was prepared and to this was added 3.24 g (27 mmole) of lithium methyltriethylboride. The addition was accompanied by a mild exotherm from the mixture which was tightly capped and stirred for 11 days. The slurry was then filtered to give filtrate A and solid residue B.

Filtrate A was analyzed by proton nmr spectroscopy. The ratio of $B(C_2H_5)_3CH_3^-$ anion to $(C_6H_{13})_4N^+$ cation found was 1.0:0.96. The ratio of solute to solvent found was ~27 mmole solute per ~24 grams of toluene. Therefore the separation of by-product salt into the toluene was essentially complete.

Solid residue B was washed with 25 ml of hot toluene and was dried to give 1.99 g of solid (theory for LiSCN is 1.76 g). An x-ray powder pattern of this solid showed four major d-spacings (3.264, 3.046, 2.794, and 2.680 in approximate order of decreasing intensity) which corresponded to those found for an authentic sample of anhydrous LiSCN (3.218, 2.993, 2.753, and 2.653).

EXAMPLE 3

Metathesis Reaction Between $LiB(C_6H_5)_4$ and KSCN

A dimethoxyethane solvate of $LiB(C_6H_5)_4$ containing 120 mmole of DME and 40 mmole of salt was combined with 40 mmole of KSCN in 30 ml of dioxolane. After stirring for 5 hours the mixture was filtered to give 14 g of solid (A) and a solution (B). The solution was evaporated and the 5.6 g of residue was redissolved in 30 ml of fresh dioxolane to give a solution whose volume was about 33 ml. The Solution had a resistivity of about 389 ohm centimeters.

A 5 ml aliquot of this solution was analyzed for $B(C_6H_5)_4^-$ and $SCN^-$ as follows. The aliquot of solution was evaporated and the residue obtained was dissolved in 5 ml of water; 10 ml of 1 M KOH solution was added and the $KB(C_6H_5)_4^-$ precipitate was collected and dried (yield: 0.45 g, 1.3 mmole $B(C_6H_5)_4^-$. The remaining Solution was acidified to ~pH 2 with dilute $HNO_3$ and $AgNO_3$ solution was added dropwise. The precipitate of AgSCN was isolated and dried (yield: 0.46 g, 3.0 mmole $SCN^-$).

Therefore in the original metathesis reaction, the following distribution of anionic species can be ascertained:

| | mmoles | |
|---|---|---|
| | $SCN^-$ | $B(C_6H_5)_4^-$ |
| original solid (A) | 20.2 | 31.4 |
| original solution (B) | 19.8 | 8.6 |

Since (B) was completely soluble yet contained some $B(C_6H_5)_4^-$ ion, it follows that (B) contained only $Li^+$ cations and therefore (A) contained a mixture of $K^+$ and $Li^+$ cations. Calculation of the cation distribution yields:

| | mmoles | |
|---|---|---|
| | $Li^+$ | $K^+$ |
| original solid (A) | 11.6 | 40 |
| original solution (B) | 28.4 | 0 |

This example demonstrates that (under the conditions chosen) LiSCN is the dominant solution species while $KB(C_6H_5)_4$ is the dominant species in the original precipitate.

EXAMPLE 4

Metathesis Reaction Between $LiB(C_6H_5)_4$ and $NH_4SCN$

A dimethoxyethane solvate of $LiB(C_6H_5)_4$ containing 120 mmole of DME and 40 mmole of $LiB(C_6H_5)_4$ was combined with 40 mmole of $NH_4SCN$ and 39 ml of dioxolane. After stirring for 5 hours the mixture was filtered to give 12.8 g of a solid (A) and a solution (B). The solution was evaporated and the 6.9 g of residue collected was redissolved in 30 ml of fresh dioxolane to give a solution whose volume was about 33 ml. This solution had a resistivity of about 437 ohm centimeters.

A 5 ml aliquot of this solution was analyzed for $B(C_6H_5)_4^-$ and $SCN^-$ as was described in the previous example. The aliquot was found to contain 0.3 mmole $B(C_6H_5)_4^-$ and 2.0 mmole $SCN^-$.

Therefore in the original metathesis reaction, the following distribution of ionic species can be determined:

|  | mmoles | |
| --- | --- | --- |
|  | $SCN^-$ | $B(C_6H_5)_6$ |
| original solid (A) | 26.8 | 38.0 |
| original solution (B) | 13.2 | 2.0 |

Since (B) was completely soluble yet contained some $B(C_6H_5)_4^-$ ion, it follows that (B) contained predominantly $Li^+$ cations and therefore solid (A) contained a mixture of $NH_4^+$ and $Li^+$ cations. Calculation of the cation distribution yields:

|  | mmoles | |
| --- | --- | --- |
|  | $Li^+$ | $NH_4^+$ |
| original solid (A) | ~25 | ~40 |
| original solution (B) | ~15 | ~0 |

This example demonstrates that (under the conditions chosen) LiSCN is the dominant solution species while $NH_4B(C_6H_5)_4$ is the dominant species in the original precipitate.

What is claimed is:

1. A method of preparing anhydrous lithium thiocyanate, comprising:
   reacting one or more thiocyanate compounds selected from the group consisting of inorganic ammonium thiocyanate, quarternary alkyl ammonium thiocyanates, trialkyl ammonium thiocyanates, non-lithium alkali metal thiocyanates and alkaline earth metal thiocyanates, with one or more lithium salts selected from the group consisting of $LiClO_4$; $LiAsF_6$; $LiBF_4$; $LiPF_6$; $LiO_3SCF_3$; $LiNO_2$; $LiNO_3$; $LiCl$; $LiBr$; $LiI$; $LiO_2CCF_3$; $LiOC_6H_5$; $LiB(C_6H_5)_4$ and $LiBR_4$ wherein R is selected from the group consisting of methyl, ethyl, butyl or mixtures thereof, in an organic solvent in which the reactants are soluble.

2. The method of claim 1 wherein a solution containing anhydrous lithium thiocyanate is obtained, comprising:
   reacting one or more thiocyanate compounds selected from the group consisting of inorganic ammonium thiocyanate, non-lithium alkali thiocyanates and alkaline earth metal thiocyanates, with a lithium salt selected from the group consisting of $LiCl$; $LiBr$; $LiI$, $LiOOCCH_3$; $LiO_2CCF_3$; $LiNO_3$; $LiNO_2$; $LiOC_6H_5$; $LiB(C_6H_5)_4$; $LiO_3SCF_3$; $LiClO_4$; $LiAsF_6$; $LiPF_6$ and $LiBF_4$, in an organic aprotic solvent in which lithium thiocyanate is soluble.

3. The method of claim 2 wherein said thiocyanate compound is selected from the group consisting of ammonium thiocyanate, sodium thiocyanate and potassium thiocyanate.

4. The method of claim 3 wherein said lithium salt is selected from the group consisting of $LiCl$; $LiBr$; $LiOOCCH_3$ and $LiB(C_6H_5)_4$.

5. The method of claim 4 wherein said organic aprotic solvent is selected from the group consisting of ethers, esters, lactones, amides, nitriles, amines, dialkylsulfoxide and dialkylsulfite.

6. The method of claim 5 wherein said lithium salt is selected from the group consisting of $LiCl$ and $LiBr$.

7. The method of claim 6 wherein said organic aprotic solvent is selected from the group consisting of diethyl ether, tetrahydrofuran, 2-methyltetrahydrofuran, dioxolane, 2-methyldioxolane, dimethoxyethane, diglyme, propylene carbonate, ethylene carbonate, butyrolactone, valerolactone, dimethylacetamide, dimethylformamide, acetonitrile, triethylamine, pyridine, dimethylsulfoxide, dimethylcarbonate and dimethylsulfite.

8. The method of claim 1 wherein said quaternary alkyl ammonium thiocyanate is selected from the group consisting of compounds having the formula $NR_4'$ wherein the R's may be the same or different and are selected from the group consisting of methyl, ethyl, propyl, butyl, pentyl and hexyl.

9. The method of claim 8 wherein said lithium salt is selected from the group consisting of $LiClO_4$; $LiAsF_6$; $LiOOCCF_3$; $LiBF_4$; $LiPF_6$; $LiI$ and $LiBR_4$.

10. The method of claim 9 wherein said solvent is selected from the group consisting of benzene, toluene and xylene.

11. The method of claim 1 wherein said trialkyl ammonium thiocyanate is selected from the group consisting of trimethyl ammonium thiocyanate, dimethyl ethyl ammonium thiocyanate, methyl diethyl ammonium thiocyanate, triethyl ammonium thiocyanate.

12. The method of claim 11 wherein said lithium salt is selected from the group consisting of $LiClO_4$; $LiAsF_6$; $LiOOCCF_3$; $LiBF_4$; $LiPF_6$; $LiI$ and $LiBR_4$.

13. The method of claim 12 wherein said organic solvent is selected from the group consisting of benzene, toluene and xylene.

14. The method of claim 1 wherein solid anhydrous lithium thiocyanate is obtained and separation is achieved by filtration.

15. The method of claim 1 wherein solid anhydrous lithium thiocyanate is obtained and separation is achieved by centrifugation.

* * * * *